(12) United States Patent
Bytheway et al.

(10) Patent No.: US 8,432,375 B2
(45) Date of Patent: Apr. 30, 2013

(54) METHOD AND SYSTEM FOR MEASURING POSITION ON SURFACE CAPACITANCE TOUCH PANEL USING A FLYING CAPACITOR

(75) Inventors: Jared G. Bytheway, Sandy, UT (US); Keith L. Paulsen, Salt Lake City, UT (US)

(73) Assignee: Cirque Corporation, Salt Lake City, UT (US)

( * ) Notice: Subject to any disclaimer, the term of this patent is extended or adjusted under 35 U.S.C. 154(b) by 0 days.

(21) Appl. No.: 13/488,089

(22) Filed: Jun. 4, 2012

(65) Prior Publication Data

US 2012/0235954 A1  Sep. 20, 2012

Related U.S. Application Data

(63) Continuation of application No. 12/592,283, filed on Nov. 20, 2009, now Pat. No. 8,194, 046.

(60) Provisional application No. 61/116,592, filed on Nov. 20, 2008.

(51) Int. Cl.
 *G06F 3/044* (2006.01)
(52) U.S. Cl.
 USPC .................................... 345/174; 178/18.06
(58) Field of Classification Search .................. 345/173, 345/174; 178/18.06
 See application file for complete search history.

(56) References Cited

U.S. PATENT DOCUMENTS

| 5,386,219 A * | 1/1995 | Greanias et al. ............... 345/174 |
| 7,864,503 B2 * | 1/2011 | Chang ........................... 361/288 |

* cited by examiner

*Primary Examiner* — Joseph Feild
*Assistant Examiner* — Andrew Sasinowski
(74) *Attorney, Agent, or Firm* — Morriss O'Bryant Compagni, PC

(57) ABSTRACT

A touch panel having a substantially even coating of a conductive material on a non-conductive substrate and then covering the conductive material with a dielectric material, wherein a novel current measuring circuit reduces the effect of stray capacitance on the accuracy of a current measurement so that the relative X and Y position of an object on the touch panel can be determined using simple ratio equations.

17 Claims, 4 Drawing Sheets

METHOD AND SYSTEM FOR MEASURING POSITION ON SURFACE CAPACITANCE TOUCH PANEL USING A FLYING CAPACITOR

CROSS REFERENCE TO RELATED APPLICATIONS

This document claims priority to, and incorporates by reference all of the subject matter included in Ser. No. 12/592,283, filed on Nov. 20, 2008, and issuing as U.S. Pat. No. 8,194,046 on Jun. 5, 2012.

BACKGROUND OF THE INVENTION

1. Field of the Invention

This invention relates generally to touchpad technology. More specifically, the present invention is a new method of determining the position of a pointing object on a surface capacitance touch panel.

2. Description of Related Art

A well-known touchpad technology uses a surface capacitance touch panel 10 as shown in FIG. 1. Such a touch panel 10 is a solid sheet of a conductive material 16 disposed on an insulating substrate 18 such as glass, with sensors 12 disposed at the corners. The traditional method of measuring the position of a pointing object 14 or the "touch position" on the surface capacitance touch panel 10 is to apply an AC signal on all four corners of the touch panel's conductive layer 16. The conductive layer 16 can be made, for example, of Indium Tin Oxide (ITO).

To create the touch panel 10, the surface of the glass substrate 18 is flooded or covered with a substantially even layer of a resistive ITO material which forms a sheet resistance. A dielectric is then applied to cover the ITO conductive material.

After applying the AC signal to the conductive ITO material 16, the next step is to triangulate the touch position using the current flowing through each corner. It is common to apply either a sine wave or a square wave.

If an object such as a finger 14 comes in contact with the surface of the touch panel 10, a capacitor is formed between the ITO surface 16 and the finger tip 14. The capacitance value is very small, typically in the order of 50 pF. The amount of charge or current that has to be measured going into each corner 12 of the panel is therefore very small. Because the current is so small, the system is very susceptible to stray capacitance. Thus, the accuracy of touch panels 10 is often an issue.

Accordingly, what is needed is a new method of triangulating the position of the object on the touch panel surface that increases the accuracy of measurements and decreases susceptibility to stray capacitance.

BRIEF SUMMARY OF THE INVENTION

It is an object of the present invention to provide a touch panel that uses a new method to determine a position of an object touching the surface thereof.

It is another object to provide a new method of measuring current that is less susceptible to stray capacitance.

In a first embodiment, the present invention is a touch panel having a substantially even coating of a conductive material on a non-conductive substrate and then covering the conductive material with a dielectric material, wherein a novel current measuring circuit reduces the effect of stray capacitance on the accuracy of a current measurement so that the relative position of an object on the touch panel can be determined using simple ratio equations.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Figure 1:
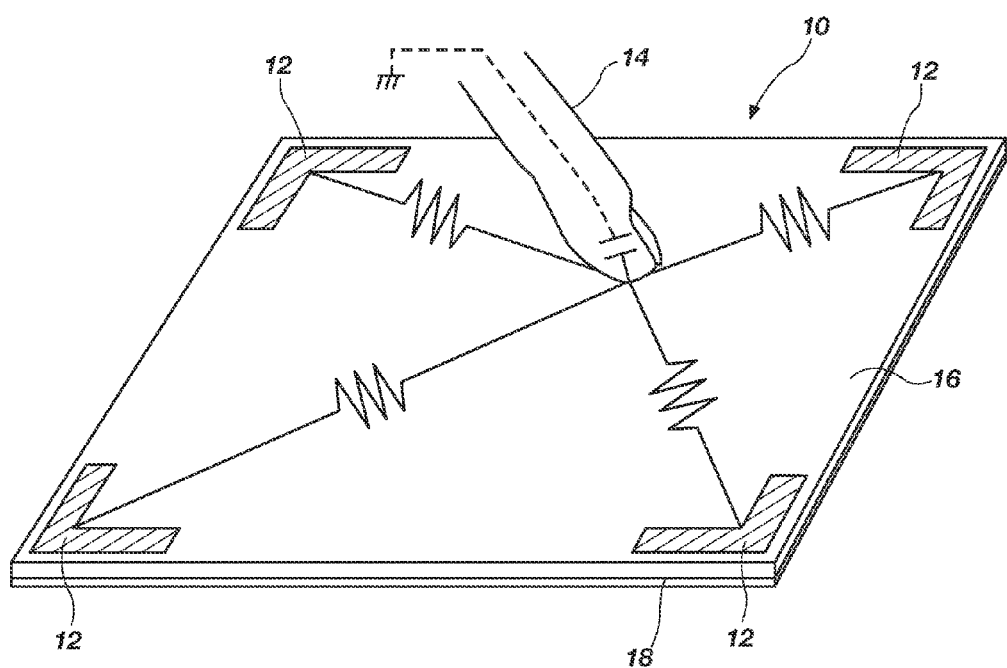
FIG. 1 is a perspective view of a touch panel, as found in the prior art.
Figure 2:
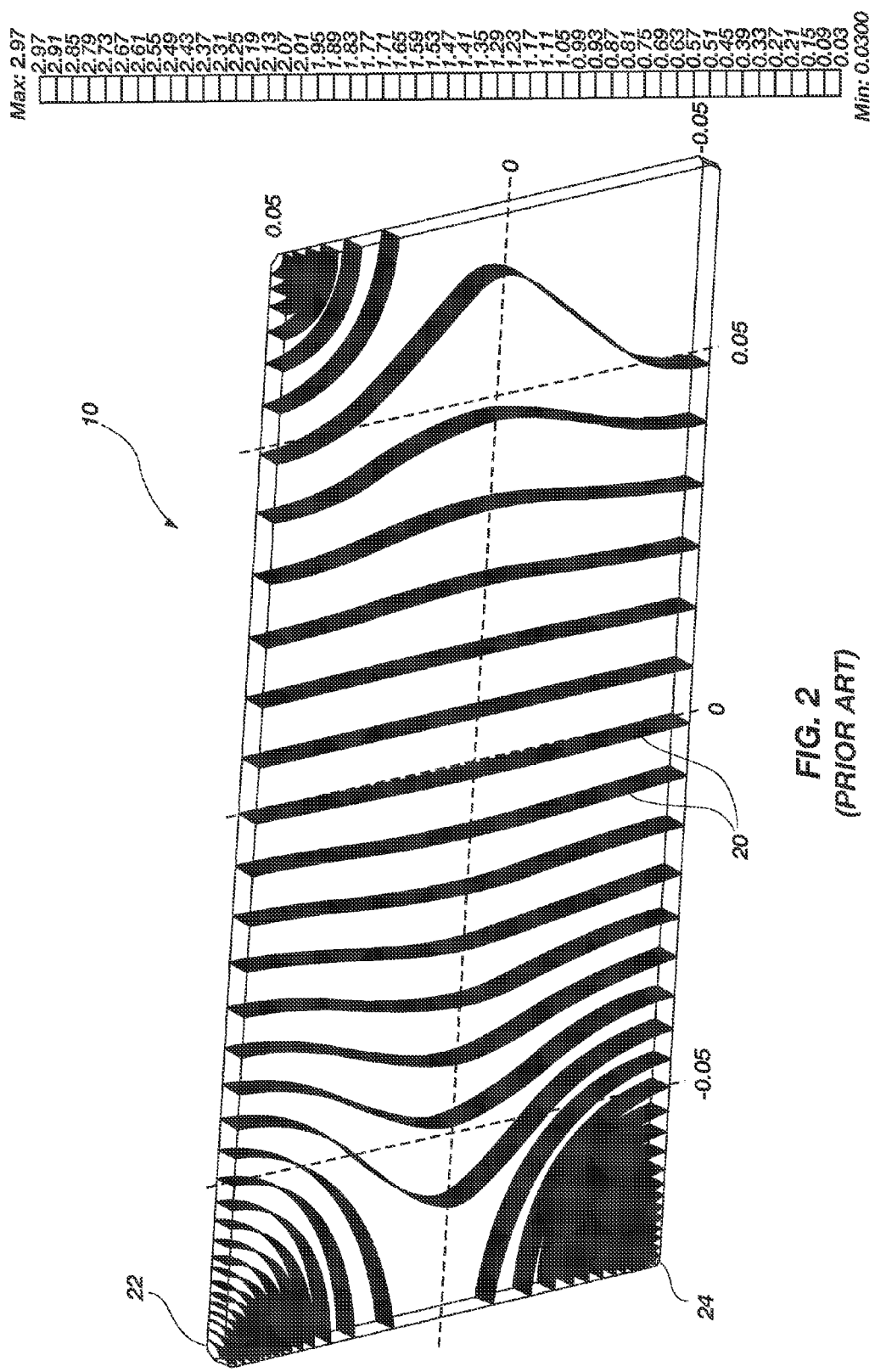
FIG. 2 is a perspective view of a touch panel 10 that is made in accordance with principles of the prior art.

FIG. 2 shows the surface of a touch panel 10 as found in the prior art. The lines 20 are indicative of the voltage gradient that is produced across the surface of the touch panel when a voltage is applied at two corners of the surface. For example, the voltage is applied at corners 22 and 24 resulting in the constant voltage gradient shown. There is significant distortion of the voltage-gradient lines 20 which is common to many touch panels 10.

Figure 3:
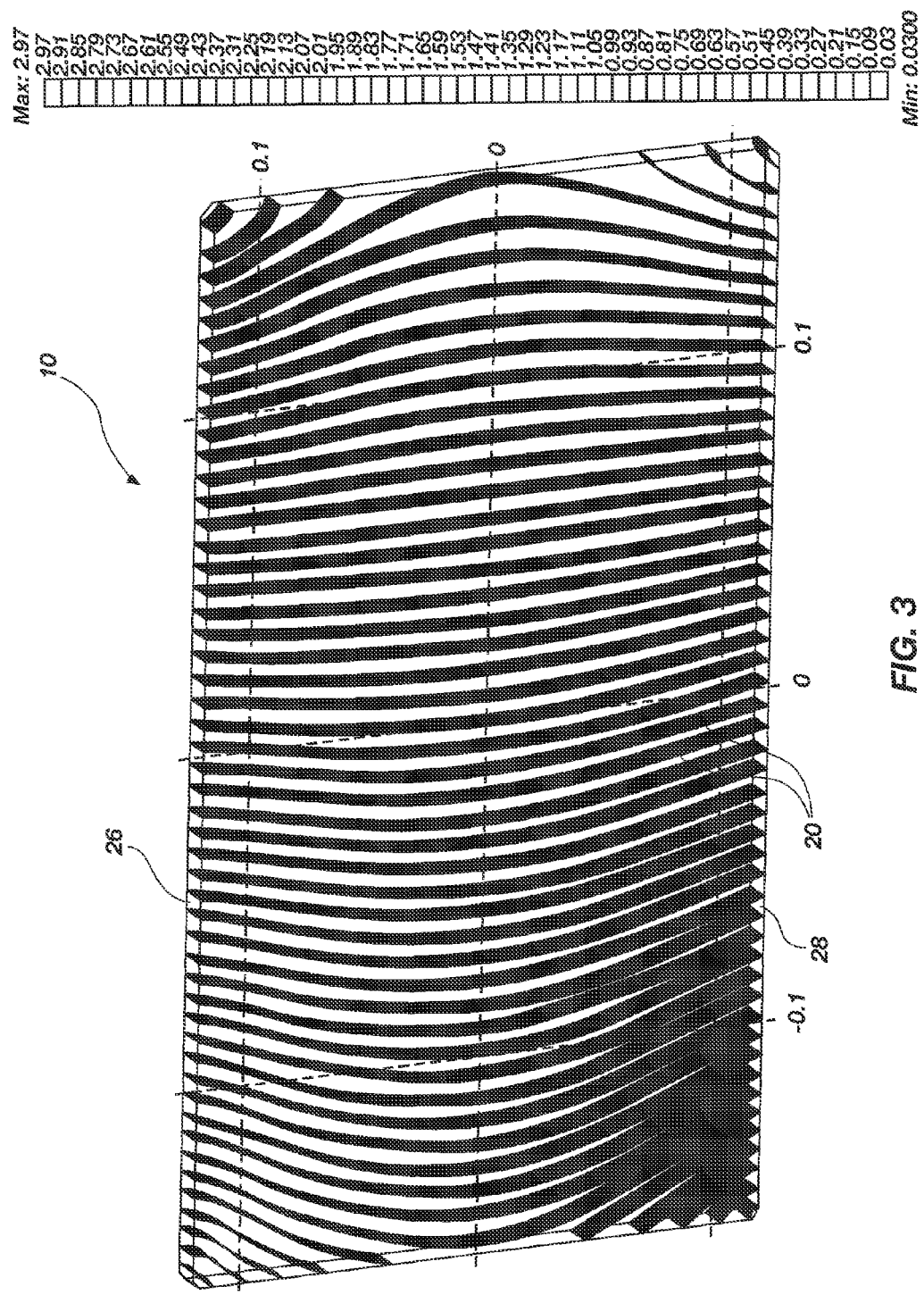
FIG. 3 is a perspective view of a touch panel 10 that is made in accordance with the principles of the present invention.

FIG. 3 is a perspective view of a touch panel 10 that is made in accordance with the principles of the present invention. A new and novel approach to determining the position of an object on the touch panel is to charge a large capacitor and then apply this "flying capacitor" to the touch panel 10. In the flying capacitor method of the present invention, this method measures the instantaneous and total current induced in a contact on a surface of the touch panel 10 when a constant voltage gradient is produced across the surface in a single axis.

Linearity of a voltage gradient can improve accuracy of the touch panel. Therefore, in a first step, it is desirable but not essential that a lower resistance material be added around the edges of the touch panel 10 on the surface. The voltage gradient lines 20 become closer and more linear from a top edge 26 to a bottom edge 28.

Figure 4:
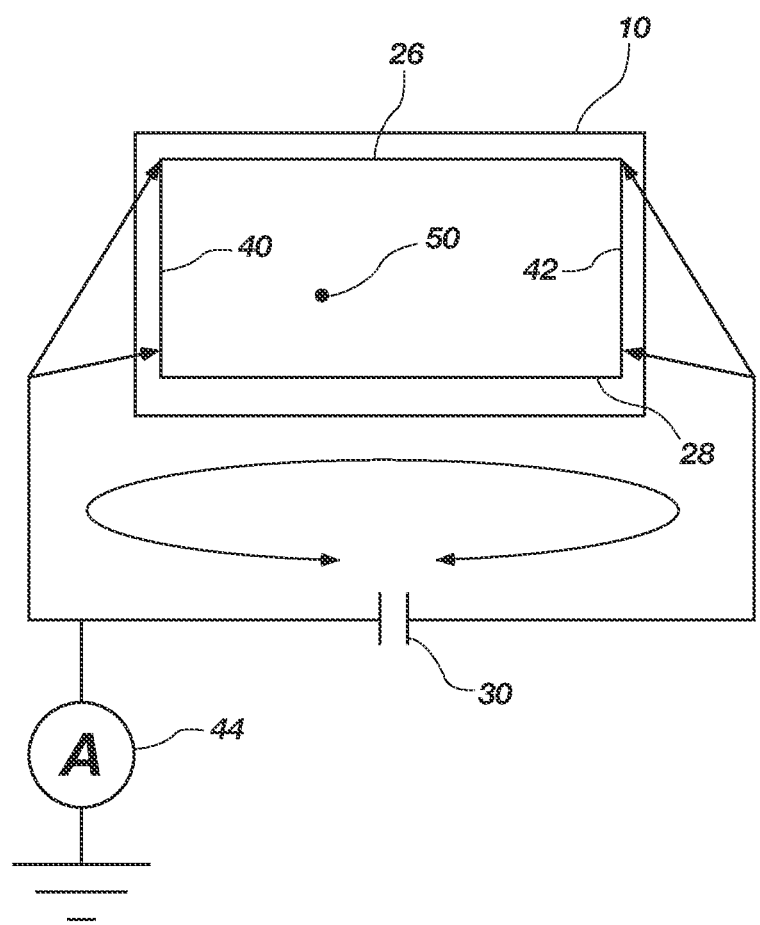
FIG. 4 is a circuit diagram showing how a sensitive current measuring circuit comprised of a capacitor and a current measuring sensor is applied to the touch panel.

FIG. 4 is a circuit diagram showing how a sensitive current measuring circuit comprised of a capacitor and a current measuring sensor is applied to the touch panel 10 in a first embodiment of the present invention. Any charge that is taken from the touch panel 10 is measured with the current measuring circuit.

In this embodiment, four measurements X1, X2, X3 and X4 must be taken in order to determine the location of a pointing object 50 (located arbitrarily on the touch panel 10) on the surface of the touch panel 10. Therefore, the first step is to electrically couple a positive node of the flying capacitor 30 to a first side 40 of the touch panel 10 while the negative node is electrically coupled to an opposite second side 42 of the touch panel along with a sensor or current measuring circuit 44. The current measuring circuit 44 can be an ammeter.

The voltage gradient is formed across the surface of the touch panel 10 from the first side 40 to the second side 42, and to the sensor circuit 44. A finger or other pointing object 50 touching the surface of the touch panel 10 at any given point will cause a drain on the current that is being measured by the sensor circuit 44. The drain in current to the sensor circuit 44 is a function of the distance of the finger from the first and second sides 40, 42 of the touch panel 10. The first measurement X1 is thus the current leaving the touch panel 10 at the second side 44.

Assume that the first side 40 is arbitrarily left side of the touch panel 10 as shown in FIG. 4. The second side 42 would therefore correspond to the right side of the touch panel 10 the first and second sides 40, 42 are arbitrarily selected and can be switched with no change in the method of the present invention.

The second current measurement X2 is taken by switching the positive and negative nodes of the flying capacitor 30 between the first and second sides 40, 42 of the touch panel 10. The current measuring circuit 44 is also moved when the circuit is reversed to take current measurement X2.

A position of the pointing object 50 can be determined as a ratio of current measurements X1 and X2. The position of the pointing object 50 is a value that is easily assigned to be between zero and one, and is determined using equation 1:

$$X=X1/(X1+X2)$$

Two similar measurements are taken using the top 26 and bottom 28 or third and fourth sides of the touch panel 10. The positive node of the flying capacitor 30 can be coupled to the top edge 26 or the bottom edge 28 first. The decision regarding which edge to connect to the positive node first is arbitrary. The result is current measurements Y1 and Y2. A Y position ratio is then obtained using equation 2:

$$Y+Y1/(Y1+Y2)$$

The strength of the present invention as described above is that the flying capacitor 30 is used to create the high current required to produce the constant voltage gradient on the surface of the touch panel 10 and thus enable direct measurement of the current leaving the surface though contacts on the surface. The current induced in the low resistance material is much larger than the current induced in the pointing object on the surface. Having a large current to measure increases the accuracy of the system and reduces the effect that stray capacitances can have on the measurements.

It should be understood that the charge on the flying capacitor 30 is rapidly being refreshed in order to maintain the voltage gradient across the touch panel 10. The process of disconnecting the flying capacitor 30 from the touch panel 10, refreshing the charge, and then reconnecting the flying capacitor to the touch panel 10 is well known to those skilled in the art and is not an aspect of the present invention.

It is also possible to determine a Z position of the pointing object relative to the surface of the touch panel 10. The Z location of the pointing object is determined using equation 3:

$$Z=(X1+X2+Y1+Y2)/4$$

The advantage of the embodiment of the present invention described above is that a voltage gradient is formed across the touch panel 10 using a relatively crude yet simple current measuring circuit 44. Nevertheless, a measurement of the current going to the pointing object is very precisely measured because there is no other path for the current to follow other than between the positive and negative nodes of the flying capacitor 30 and the pointing object 50.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for determining the position of a pointing object on a first axis of a surface capacitance touch panel, said method comprising:
   1) providing a touch panel comprised of an insulating substrate, a resistive material disposed on the substrate, and a dielectric disposed on the resistive material;
   2) connecting a charged capacitor to opposite first and second edges of the resistive material and measuring current X1 through a path from the first edge to an electrostatic ground using a current measurement circuit;
   3) switching connections of the charged capacitor between the first and second edges of the resistive material and measuring current X2 through a path from the second edge to the electrostatic ground using the current measurement circuit; and
   4) determining a position of the pointing object on the first axis between the first and second edges on a surface of the resistive material as a ratio of measured currents X1 and X2.

2. The method as defined in claim 1 wherein the method further comprises determining the position of the pointing object in a second axis that is between different opposite edges of the touch panel.

3. The method as defined in claim 2 wherein the method further comprises:
   1) connecting a charged capacitor to opposite third and fourth edges of the resistive material and measuring current Y1 through a path from the third edge to the electrostatic ground using the current measurement circuit;
   2) switching connections of the charged capacitor between the third and fourth edges of the resistive material and measuring current Y2 through a path from the fourth edge to the electrostatic ground using the current measurement circuit; and
   3) determining a position of the pointing object on the second axis that is between the third and fourth edges on a surface of the resistive material as a ratio of measured currents Y1 and Y2.

4. The method as defined in claim 2 wherein the method further comprises connecting a positive node of the capacitor to the third edge, and a negative node of the flying capacitor to the fourth edge in order to measure current Y1.

5. The method as defined in claim 2 wherein the method further comprises connecting a positive node of the capacitor to the fourth edge, and a negative node of the capacitor to the third edge in order to measure current Y2.

6. The method as defined in claim 2 wherein the method further comprises determining the position of the pointing object in any axis that is defined as being disposed between any two opposite edges of the touch panel.

7. The method as defined in claim 3 wherein the method further comprises increasing accuracy of the method for measuring the position of a pointing object on the touch panel by only allowing the current to drain to the pointing object and to the current measurement circuit.

8. The method as defined in claim 3 wherein the method further comprises determining a position of the pointing object in the first axis using the equation $X=X1/(X1+X2)$.

9. The method as defined in claim 8 wherein the method further comprises determining a position of the pointing object in the second axis using the equation $Y=Y1/(Y1+Y2)$.

10. The method as defined in claim 1 wherein the method further comprises connecting a positive node of the capacitor to the first edge, and a negative node of the capacitor to the second edge in order to measure current X1.

11. The method as defined in claim 1 wherein the method further comprises connecting a positive no of the capacitor to the second edge, and a negative node of the capacitor to the first edge in order to measure current X2.

12. The method as defined in claim 1 wherein the method further comprises providing a known voltage on the capacitor in order to determine how much current is being drained from the resistive material by the presence of the pointing object.

13. The method as defined in claim 12 wherein the method further comprises refreshing the capacitor to the known voltage in order to maintain the voltage gradient across the resistive material.

14. The method as defined in claim 1 wherein the method further comprises creating a linear voltage gradient across the resistive material.

15. The method as defined in claim 1 wherein the method further comprises using an ammeter as the current measuring circuit.

16. A method for determining the position of a pointing object on a first axis of a surface capacitance touch panel, said method comprising:

1) providing a touch panel comprised of an insulating substrate, a resistive material disposed on the substrate, and a dielectric disposed on the resistive material;
2) providing a voltage gradient from a flying capacitor across a resistive material from a first edge to a second edge, and measuring a first current through a path from the first edge to an electrostatic ground using a current measurement circuit;
3) switching connections of the flying capacitor between the first and second edges of the resistive material and measuring a second current through a path from the second edge to an electrostatic ground using the current measurement circuit; and
4) determining a position of the pointing object on the first axis between the first and second edges on a surface of the resistive material as a ratio of measured first and second currents.

17. A surface capacitance touch panel that can determine the position of a pointing object on a first axis thereof, said surface capacitance touch panel comprised of:
an insulating substrate;
a resistive material disposed on the substrate;
a dielectric disposed on the resistive material;
a flying capacitor for that is switchabiy coupled to any opposite edges of the resistive material to thereby selectively provide a voltage gradient across the resistive material from one edge to as opposite edge;
a current measuring circuit that is coupled to one end of the flying capacitor and to electrostatic ground, to thereby measure current through a path from an edge to electrostatic ground; ands
means for determining a position of the pointing object on the first axis between the opposite edges on a surface of the resistive material as a ratio of measured currents.

* * * * *